US010857992B2

(12) United States Patent
Morita et al.

(10) Patent No.: US 10,857,992 B2
(45) Date of Patent: Dec. 8, 2020

(54) CONTROL METHOD FOR HYBRID VEHICLES

(71) Applicant: NISSAN MOTOR CO., LTD., Yokohama (JP)

(72) Inventors: Tetsunobu Morita, Kanagawa (JP); Hiroshi Arita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/500,277

(22) PCT Filed: Apr. 4, 2017

(86) PCT No.: PCT/JP2017/014127
§ 371 (c)(1),
(2) Date: Oct. 2, 2019

(87) PCT Pub. No.: WO2018/185849
PCT Pub. Date: Oct. 11, 2018

(65) Prior Publication Data
US 2020/0164860 A1  May 28, 2020

(51) Int. Cl.
*B60W 30/00*  (2006.01)
*B60W 20/14*  (2016.01)
(Continued)

(52) U.S. Cl.
CPC ............ *B60W 20/14* (2016.01); *B60K 6/365* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

2012/0072064 A1* 3/2012 Kumazaki ........... F16H 61/0213
701/22
2012/0108388 A1* 5/2012 Akebono .............. B60W 20/40
477/12

(Continued)

FOREIGN PATENT DOCUMENTS

JP   2010-179865 A    8/2010
JP   2010-221853 A   10/2010
(Continued)

*Primary Examiner* — Jonathan M Dager
(74) *Attorney, Agent, or Firm* — Foley & Lardner LLP

(57) ABSTRACT

Provided is a control method for hybrid vehicles that change an operation mode of the vehicle between HEV mode and EV mode in accordance with the size of a target drive force. When the manual-driving mode is set, the target driving force is calculated based on a vehicle-speed and a driver's driving operation, and when self-driving is set, the target driving force is calculated based on a target vehicle-speed and an actual vehicle-speed. When self-driving is set, an amount to enlarge a dead-zone width Wα to control the motor generator to perform powering relative to the dead-zone width when the manual-driving mode is set is set larger than an amount to enlarge a dead-zone width to control the motor generator to perform regeneration relative to the dead-zone width when the manual-driving mode is set.

3 Claims, 7 Drawing Sheets

(51) Int. Cl.
*B60K 6/365* (2007.10)
*B60K 6/48* (2007.10)
*B60K 6/547* (2007.10)
*B60W 20/30* (2016.01)

(52) U.S. Cl.
CPC ........ *B60W 20/30* (2013.01); *B60L 2240/423* (2013.01); *B60L 2240/486* (2013.01); *B60W 2520/10* (2013.01); *B60W 2710/244* (2013.01)

(56) References Cited

U.S. PATENT DOCUMENTS

| | | | | |
|---|---|---|---|---|
| 2012/0109438 | A1* | 5/2012 | Akebono | B60W 10/02 701/22 |
| 2012/0203406 | A1* | 8/2012 | Akebono | B60W 30/18027 701/22 |
| 2013/0166131 | A1* | 6/2013 | Shiiba | B60W 10/12 701/22 |
| 2014/0180521 | A1* | 6/2014 | Tsuchikawa | B60W 10/08 701/22 |
| 2015/0006000 | A1* | 1/2015 | Kawata | B60W 20/40 701/22 |
| 2015/0046006 | A1* | 2/2015 | Shimoyama | B60W 40/076 701/22 |
| 2016/0185337 | A1* | 6/2016 | Morita | B60W 50/06 701/22 |
| 2018/0099580 | A1* | 4/2018 | Kumazaki | B60W 20/15 |
| 2019/0100114 | A1* | 4/2019 | Sawada | H02P 23/18 |
| 2019/0193750 | A1* | 6/2019 | Kim | B60W 10/08 |
| 2020/0180632 | A1* | 6/2020 | Morita | B60T 8/00 |

FOREIGN PATENT DOCUMENTS

| | | |
|---|---|---|
| JP | 2012-86802 A | 5/2012 |
| JP | 2012-91558 A | 5/2012 |

* cited by examiner

CONTROL METHOD FOR HYBRID VEHICLES

TECHNICAL FIELD

The present invention relates to control methods for hybrid vehicles.

BACKGROUND ART

Conventionally control methods for hybrid vehicles have been known, which change the operation mode of the vehicle between a hybrid electric vehicle mode and an electric vehicle mode (see Patent Document 1, for example). The hybrid electric vehicle mode connects both of a motor and an engine to driving wheels so as to transmit a driving force from the motor and the engine. The electric vehicle mode disconnects the engine from a driving system and connects the motor only to the driving wheels so as to transmit a driving force from the motor.

CITATION LIST

Patent Document

Patent Document 1: JP 2012-91558 A

SUMMARY OF INVENTION

Problem to be Solved by the Invention

When a driver sets a hybrid vehicle at a self-driving mode so that the actual vehicle-speed of the vehicle keeps a target vehicle-speed without any pedal operation by the driver, the vehicle generates a subtle vehicle-speed control that would not be generated during a manual-driving mode that is a driving mode by the driver's pedal operation. In response to such a subtle vehicle-speed control, the self-driving mode has more frequent fluctuation of the target driving force than that in the manual-driving mode. If such a fluctuation of the target driving force leads to switching between the electric vehicle mode and the hybrid electric vehicle mode based on the same standard as that for the manual-driving mode, the frequency of such mode switching increases as compared with the manual-driving mode, and this bothers the driver.

To suppress such an increase in the mode-switching frequency, a large width of dead zone (hysteresis area) may be set between the hybrid electric vehicle area and the electric vehicle area. This, however, limits the mode shifting from the hybrid electric vehicle mode to the electric vehicle mode, and so reduces the regenerative amount.

In view of these problems, the present disclosure aims to provide a control method for hybrid vehicles capable of suppressing an increase in the frequency of mode switching while suppressing a decrease in the regenerative amount when the hybrid vehicle is set at the self-driving mode.

Means for Solving the Problem

To achieve the aim, the present disclosure provides a control method for hybrid vehicles that change an operation mode of the vehicle between a hybrid electric vehicle mode that connects both of a motor and an engine to driving wheels so as to transmit a driving force from the motor and the engine, and an electric vehicle mode that disconnects the engine from a driving system and connects the motor only to the driving wheels so as to transmit a driving force from the motor.

The method firstly calculates a target driving force to control the motor to perform powering or a target driving force to control the motor to perform regeneration.

Next the method determines whether the target driving force is in an electric vehicle area having a small absolute value of the target driving force or in a hybrid electric vehicle area having an absolute value of the target driving force larger than the absolute value of the electric vehicle area.

When the target driving force shifts from the electric vehicle area to the hybrid electric vehicle area, the method changes the operation mode from the electric vehicle mode to the hybrid electric vehicle mode.

When the target driving force shifts from the hybrid electric vehicle area to the electric vehicle area via a dead-zone, the method changes the operation mode from the hybrid electric vehicle mode to the electric vehicle mode.

When self-driving is not set, the method calculates the target driving force based on a vehicle-speed and a driver's driving operation. When self-driving is set, the method calculates the target driving force based on a target vehicle-speed and an actual vehicle-speed, and sets an amount to enlarge a dead-zone width to control the motor to perform powering relative to a dead-zone width when the self-driving is not set larger than an amount to enlarge a dead-zone width to control the motor to perform regeneration relative to a dead-zone width when the self-driving is not set.

Effect of the Invention

The present disclosure therefore suppresses an increase in the frequency of mode switching while suppressing a decrease in the regenerative amount when the hybrid vehicle is set at the self-driving mode.

DESCRIPTION OF EMBODIMENTS

Figure 1:
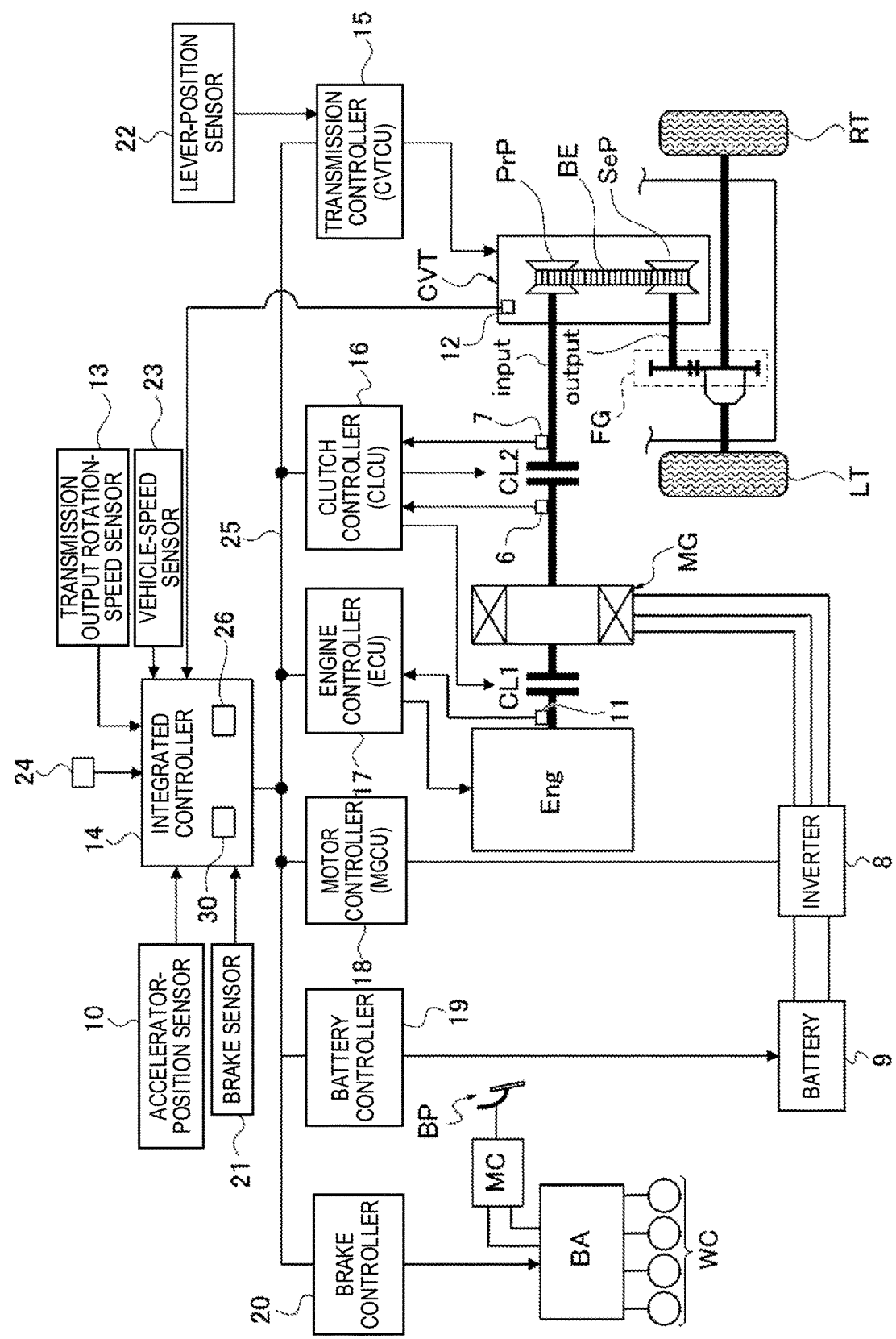
FIG. 1 shows the overall structure of a FF hybrid vehicle to which a control method for hybrid vehicles in Example 1 is applied.

The following describes one embodiment of a control method for hybrid vehicles according to the present disclosure, by way of Example 1 shown in the drawings.

Example 1

Firstly the structure is described below.

A control method for hybrid vehicles in Example 1 is applied to an FF hybrid vehicle including a parallel hybrid driving system called a 1-motor/2-clutche type. The following describes the structure of an FF hybrid vehicle, to which the control method of Example 1 is applied, about the "detailed structure of a driving system", the "detailed structure of operation modes", the "detailed structure of a control system", the "configuration of dead-zone width setting" and the "configuration of EV enabling determination".

[Detailed Structure of a Driving System]

As shown in FIG. 1, the driving system of the FF hybrid vehicle includes an engine Eng, a first clutch CL1, a motor generator MG (motor), a second clutch CL2, a continuously variable transmission CVT, a final gear FG, a left driving wheel LT and a right driving wheel RT. This FF hybrid vehicle includes a brake-fluid pressure actuator BA as well.

The torque of the engine Eng is controlled so that the engine torque agrees with the instructed value by controlling the intake air mass by a throttle actuator, the amount of fuel injection by an injector, and the ignition timing by an ignition plug. The engine Eng may operate at the cranking-operation mode simply to engage with the first clutch CL1 and not at the combustion-operation mode. The engine at the cranking-operation mode generates a friction torque due to frictional sliding resistance between the piston and the cylinder inner wall, for example.

The first clutch CL1 is inserted between the engine Eng and the motor generator MG. For this first clutch CL1, a dry multi-plate clutch of a normally open type may be used, for example, for engagement/slip engagement/releasing between the engine Eng and the motor generator MG. While this first clutch CL1 in the completely engagement state transmits the motor torque+the engine torque to the second clutch CL2, the first clutch CL1 in the releasing state transmits the motor torque only to the second clutch CL2. The engagement/slip engagement/releasing of the first clutch CL1 is hydraulically controlled, i.e., the transmitted torque (clutch torque capacity) is generated in accordance with the hydraulic pressure of the clutch (pressing force).

The motor generator MG has an AC synchronous motor structure, and controls the motor torque and the motor rotation speed during the starting and the running. The motor generator MG also recovers (charges) the vehicle kinetic energy generated by regenerative braking control to a battery 9 during braking and deceleration.

The second clutch CL2 is a wet multi-plate clutch or a wet multi-plate brake of a normally open type that is disposed at forward/backward changeover system in the continuously variable transmission CVT. The second clutch CL2 generates a transmitted torque (clutch torque capacity) in accordance with the hydraulic pressure of the clutch (pressing force). This second clutch CL2 transmits the torque output from the engine Eng and the motor generator MG (engaged with the first clutch CL1) to the left and right driving wheels LT and RT via the continuously variable transmission CVT and the final gear FG. This second clutch CL2 may be disposed at a position between the continuously variable transmission CVT and the left and right driving wheels LT, RT instead of disposing position between the motor generator MG and the continuously variable transmission CVT as in FIG. 1.

The continuously variable transmission CVT is a belt-type continuously variable transmission and includes a primary pulley PrP connecting to the input shaft (input) of the transmission, a secondary pulley SeP connecting to the output shaft (output) of the transmission, and a pulley belt BE that runs between the primary pulley PrP and the secondary pulley SeP.

The primary pulley PrP has a fixed sheave fixed to the transmission input shaft (input) and a movable sheave that is slidably supported at the transmission input shaft (input). The secondary pulley SeP has a fixed sheave fixed to the transmission output shaft (output) and a movable sheave that is slidably supported at the transmission output shaft (output).

The pulley belt BE is a metal belt that runs between the primary pulley PrP and the secondary pulley SeP, and is held between the fixed sheave and the movable sheave of each pulley. For the pulley belt BE, a pin-type belt or a VDT type belt may be used in this example.

The continuously variable transmission CVT is configured to change the pulley width of these pulleys PrP and SeP, and accordingly change the diameter of the face for running of the pulley belt BE so as to freely control the transmission ratio (pulley ratio). A larger pulley width of the primary pulley PrP as well as a smaller pulley width of the secondary pulley SeP change the transmission ratio to Low. A smaller pulley width of the primary pulley PrP as well as a larger pulley width of the secondary pulley SeP change the transmission ratio to High.

The brake-fluid pressure actuator BA controls the wheel cylinder hydraulic pressure to be supplied to the wheel cylinder WC of each wheel in accordance with a hydraulic-pressure command that the master cylinder MC converts the tread power given to the brake pedal BP and a braking force command from the brake controller 20.

[Detailed Structure of Operation Modes]

The FF hybrid vehicle of Example 1 has some operation modes, such as an electric vehicle mode (hereinafter called "EV mode") and a hybrid electric vehicle mode (hereinafter called "HEV mode"), by the driving system as stated above.

In the "EV mode", the first clutch CL1 is released and the second clutch CL2 is engaged so that the engine Eng is disconnected from the driving system and the motor generator MG only is connected to the left and right driving wheels LT, RT to transmit the driving force. With this configuration, when the "EV mode" controls the motor generator MG to perform the powering, the motor generator MG operates as a driving source for running (motor). When the "EV mode" controls the motor generator MG to perform the regeneration, the motor generator MG operates as a driving source for power generation (generator).

"Controlling the motor generator MG to perform the powering" means supplying electricity from an inverter 8 to the motor generator MG, so that the motor generator MG in the powering state drives the left and right driving wheels LT and RT. "Controlling the motor generator MG to perform the regeneration" means controlling the motor generator MG to be in the regeneration state where the rotation energy of the motor generator MG and the left and right driving wheels LT and RT flow into the inverter 8.

In the "HEV mode", the first clutch CL1 is engaged and the second clutch CL2 is engaged so that both of the motor generator MG and the engine Eng are connected to the left and right driving wheels LT, RT to transmit the driving force. With this configuration, when the "HEV mode" controls the motor generator MG to perform the powering, the engine Eng and the motor generator MG operate as a driving source for running. When the "HEV mode" controls the motor generator MG to perform the regeneration, the motor generator MG operates as a driving source for power generation (generator). The engine Eng in this case may rotate along with the motor generator MG so as to give engine friction to the driving system.

Figure 2:
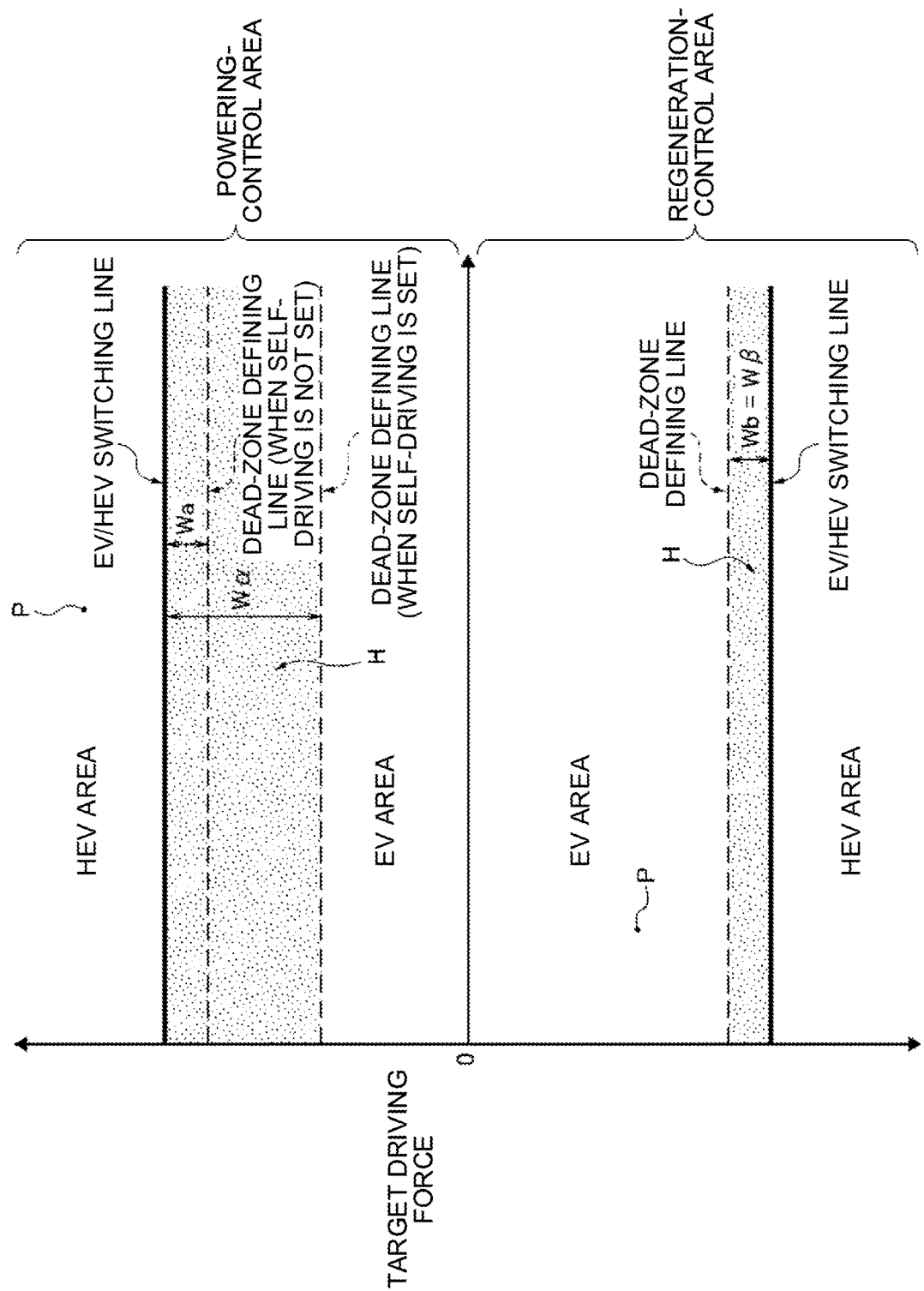
FIG. 2 shows one example of a mode-shift map set by the control method for hybrid vehicles in Example 1.

The mode shift between the "EV mode" and the "HEV mode" is performed based on a target driving force and a mode-shift map shown in FIG. 2. Specifically to control the motor generator MG to perform the powering, an operating point P is set in the powering-control area that is above the zero-axis of the target driving force in FIG. 2, where the operating point P is set in accordance with a target driving force. When this operating point P is in the EV area, the "EV mode" is selected. When the operating point P is in the HEV area, the "HEV mode" is selected. To control the motor generator MG to perform the regeneration, an operating point P is set in the regeneration-control area that is below the zero-axis of the target driving force in FIG. 2, where the operating point P is set in accordance with a target driving force. When this operating point P is in the EV area, the "EV mode" is selected. When the operating point P is in the HEV area, the "HEV mode" is selected.

The "EV area" is an area to let the vehicle run with electricity, having a small absolute value of the target driving force. The "HEV area" is an area to let the vehicle run in a hybrid manner, having an absolute value of the target driving force that is larger than that in the EV area. These EV area and HEV area are segmented by thick lines in FIG. 2 indicating EV/HEV switching lines.

The calculation method of the target driving force depends on the driving mode. Specifically when the self-driving mode is set, the target driving force is calculated based on the target vehicle-speed and the actual vehicle-speed. When the manual-driving mode is set (i.e., self-driving mode is not set), the target driving force is calculated based on the vehicle-speed and the driver's driving operation (in this case, the accelerator position (or accelerator opening degree) and the tread force to the brake).

That is, when the self-driving mode is set, the method firstly sets any target vehicle-speed, and sets a target driving force in accordance with the set target vehicle-speed as an initial value. Next the method detects the actual vehicle-speed with a vehicle-speed sensor 23, and calculates a difference between the detected actual vehicle-speed and the target vehicle-speed. Then the method calculates a required driving-force adjustment to keep this difference in a predetermined range, and adds the driving-force adjustment to the initial value of the target driving force to obtain a new target driving force. In this way, when the self-driving mode is set, the method calculates the target driving force by feedback controlling based on the actual vehicle-speed.

When the manual-driving mode is set, the method sets a target driving force based on the operating point depending on the vehicle-speed and the accelerator position and a preset driving-force setting map.

The "self-driving mode" calculates the target driving force by feedback control and controls the actual vehicle-speed to follow the target vehicle-speed. This allows the vehicle to automatically run at the set vehicle-speed (target vehicle-speed) without driver's operation of the accelerator pedal or the brake pedal (auto-cruise running mode). Specifically this "self-driving mode" covers a system concept, such as ICC (Intelligent Cruise Control), ACC (Adaptive Cruise Control), or ASCD (Auto Speed Control Device). Among these self-driving modes, ASCD, for example, has a vehicle-speed control function to set any vehicle-speed set by the driver as the "target vehicle-speed" and let the actual vehicle-speed follow this "target vehicle-speed". ICC or ACC has a function to automatically control an inter-vehicle distance in addition to the function to control the vehicle-speed. This system concept sets any vehicle-speed as the "target vehicle-speed" based on the information from a radar sensor or a camera, for example, installed at a front part of the vehicle when no car is running ahead. When a car is running ahead, the ICC or ACC sets a vehicle-speed to keep the preset inter-vehicle distance constant as the "target vehicle-speed" for control.

The self-driving mode controls the engine Eng, the motor generator MG, the continuously variable transmission CVT, and the brake-fluid pressure actuator BA independently of the driver's driving operation, so as to control the driving force and the braking force of the vehicle and so adjust the acceleration and deceleration. In response to an acceleration request, the self-driving mode generates a driving force with the output torque from the motor generator MG or the engine Eng. In response to a deceleration request, the self-driving mode firstly generates a braking force with the regenerative torque of the motor generator MG. If the braking force obtained from the regenerative torque is insufficient for the deceleration request, the self-driving mode generates a necessary braking force with the engine brake force (engine friction) and the hydraulic brake force.

In the "manual-driving mode", the driver operates the accelerator pedal and the brake pedal to control the vehicle-speed for running.

When the absolute value of the target driving force increases so that the operating point P in the EV area crosses the EV/HEV switching line to shift to the HEV area, the first clutch CL1 is engaged and the combustion of the engine Eng starts to switch from the "EV mode" to the "HEV mode". That is, the mode is shifted from EV to HEV.

When the absolute value of the target driving force decreases so that the operating point P in the HEV area crosses the EV/HEV switching line to shift to the EV area, the first clutch CL1 is released and the engine Eng is stopped to switch from the "HEV mode" to the "EV mode". That is, the mode is shifted from HEV to EV. The EV area has dead-zone defining lines indicated with broken lines. The map has dead-zones H (dotted parts in FIG. 2) to keep the "HEV mode", and each dead-zone H is between the EV/HEV switching line and the dead-zone defining line and has a predetermined width. Specifically during mode shifting of HEV→EV, the operating point P shifts from the HEV area to the EV area via the dead-zone H. While the operating point P is in the dead-zone H, the mode does not shift to the "EV mode" to keep the "HEV mode". During mode shifting of EV→HEV, the dead-zone H is ignored.

During the manual-driving mode, the width of this dead-zone H is set at the same value between the controlling of the motor generator MG to perform the powering and the controlling of the motor generator MG to perform the regeneration. In other words, as shown in FIG. 2, the dead-zone width Wa set in the powering-control area and the dead-zone width Wb set in the regeneration-control area are the same. In this example, the width is 3 [kN]. This numerical value is one example, which may be any value as long as it absorbs the fluctuation of a target driving force generated during the manual-driving.

During the self-driving mode, the width of this dead-zone H to control the motor generator MG to perform the powering is enlarged relative to the dead-zone width Wa during the manual-driving mode. The width of the dead-zone H to control the motor generator MG to perform the regeneration is not enlarged relative to the dead-zone width Wb during the manual-driving mode.

That is, the dead-zone defining line set in the powering-control area during the self-driving mode has a smaller target driving force set than the target driving force of the dead-zone defining line set in the powering-control area during the manual-driving mode. The dead-zone defining line set in the regeneration-control area during the self-driving mode has the same target driving force set as the target driving force of the dead-zone defining line set in the regeneration-control area during the manual-driving mode.

This means that the amount to enlarge the width of the dead-zone H during the self-driving mode relative to the dead-zone width Wa during the manual-driving mode is larger in the case of controlling of the motor generator MG to perform the powering than in the case of controlling of the motor generator MG to perform the regeneration. As a result, the dead-zone width Wα in the powering-control area during the self-driving mode is set larger than the dead-zone width Wβ in the regeneration-control area. In this example, the dead-zone width Wα is set at 27 [kN], and the dead-zone width Wβ is set at 3 [kN].

These numerical values are one example, and the dead-zone width Wα set to control the motor generator MG to perform the powering during the self-driving mode may be any value as long as it absorbs the fluctuation of a target driving force calculated by feedback control. Preferably the dead-zone width Wα is set as small as possible. The width of "fluctuation of the target driving force calculated by feedback control" may be obtained by experiments, for example.

The dead-zone width Wβ set to control the motor generator MG to perform the regeneration during the self-driving mode may be any value as long as it does not considerably reduce the regenerative amount during the self-driving mode as compared with the regeneration amount during the manual-driving mode.

[Detailed Structure of a Control System]

As shown in FIG. 1, a control system of the FF hybrid vehicle includes an integrated controller 14, a transmission controller 15, a clutch controller 16, an engine controller 17, a motor controller 18, a battery controller 19, and a brake controller 20. The control system includes, as sensors, a motor-rotation-speed sensor 6, a transmission input rotation-speed sensor 7, an accelerator-position sensor 10, an engine-revolution-speed sensor 11, an oil-temperature sensor 12, and a transmission output rotation-speed sensor 13. The control system also includes a brake sensor 21, a lever-position sensor 22, a vehicle-speed sensor 23, and a self-driving setting switch sensor 24.

The integrated controller 14 calculates a target driving force from the battery condition, the accelerator position, the vehicle-speed (a value in synchronization with the output rotation-speed of the transmission), the hydraulic oil temperature, the target vehicle-speed and the like. Based on the calculation of the target driving force, the integrated controller 14 calculates a command value to each of the actuators (the motor generator MG, the engine Eng, the first clutch CL1, the second clutch CL2, the continuously variable transmission CVT, and the brake-fluid pressure actuator BA), and transmits the calculated command values to the corresponding controllers 15, 16, 17, 18, 19, and 20 via CAN communication wire 25.

The transmission controller 15 performs transmission control so as to fulfill the transmission command from the integrated controller 14 by controlling the hydraulic pressure of the oil supplied to the primary pulley PrP and the secondary pulley SeP of the continuously variable transmission CVT.

Figure 3:
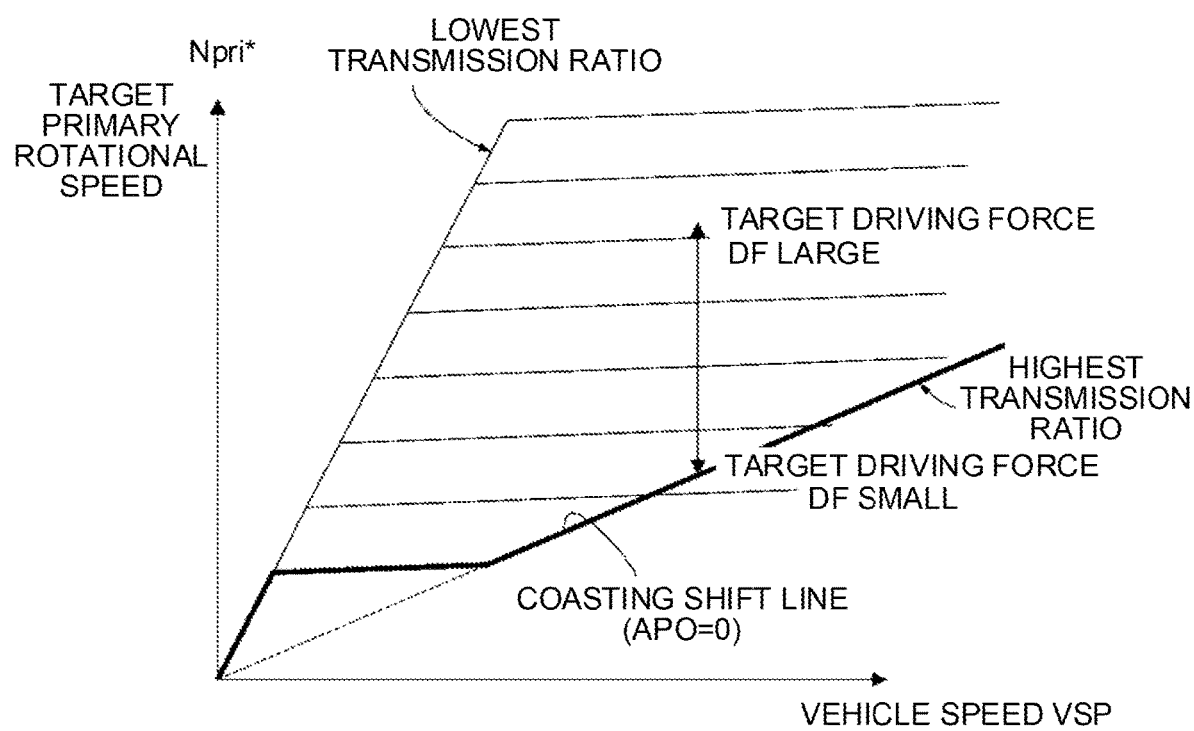
FIG. 3 shows one example of a transmission schedule map used in Example 1.

The transmission control by the transmission controller 15 is based on a transmission schedule map shown in FIG. 3 and the operating point depending on the vehicle-speed VSP and the target driving force DF, and determines a target primary number of revolutions Npri* based on the operating point (VSP, DF) on the transmission schedule map. As shown in FIG. 3, the transmission schedule changes the transmission ratio in the transmission-ratio width between the Lowest transmission ratio and the Highest transmission ratio based on the operating point (VSP, DF). The thick line of FIG. 3 indicates the coasting shift line in response to the releasing of the driver's foot from the accelerator pedal. In one example, a decrease in the vehicle-speed VSP (deceleration) during the coasting EV running at the Highest transmission ratio causes the downshift from the Highest transmission ratio to the Lowest transmission ratio.

The clutch controller 16 receives sensor information from sensors, such as the engine-revolution-speed sensor 11, the motor-rotation-speed sensor 6, and the transmission input rotation-speed sensor 7, and outputs a clutch hydraulic pressure command value to the first clutch CL1 and the second clutch CL2. This sets the pressing force to the first clutch CL1 and the pressing force to the second clutch CL2.

The engine controller 17 receives sensor information from the engine-revolution-speed sensor 11 and controls the torque of the engine Eng so as to fulfill the engine-torque command value from the integrated controller 14.

The motor controller 18 outputs a control command to the inverter 8 so as to fulfill the motor-torque command value and the motor-rotation-speed command value from the integrated controller 14, and controls the motor torque and the motor rotation speed of the motor generator MG. The inverter 8 converts DC/AC, and changes the discharging current from the battery 9 to the driving current for the motor generator MG. The inverter 8 also changes the current generated from the motor generator MG to the charging current for the battery 9.

The battery controller 19 manages the charging capacity SOC of the battery 9, and transmits the SOC information to the integrated controller 14 and the engine controller 17.

The brake controller 20 receives sensor information from the brake sensor 21, and outputs a braking-force command to the brake-fluid pressure actuator BA so as to fulfill the braking-force command from the integrated controller 14 to control the brake-fluid pressure.

The self-driving setting switch sensor 24 detects an operation signal of the self-driving switch that the driver turns ON/OFF. When the self-driving switch turns ON, the self-driving setting switch sensor 24 transmits a self-driving command to the integrated controller 14. This sets a self-driving mode. When the self-driving switch turns OFF, the self-driving setting switch sensor 24 transmits a self-driving cancel command to the integrated controller 14. This cancels the self-driving mode and sets a manual-driving mode.

The self-driving mode is configured so as to, when the driver operates with an accelerator pedal to increase the vehicle-speed to any vehicle-speed not lower than the predetermined vehicle-speed, and operates the self-driving setting switch to turn ON, set this vehicle-speed as a target vehicle-speed. After that, when a vehicle running ahead is detected based on the information from a not-illustrated radar sensor, for example, the self-driving mode sets a vehicle-speed to keep the inter-vehicle distance from the detected vehicle constant as the target vehicle-speed.

When a driver performs a predetermined pedal operation, such as pressing the brake pedal, the self-driving setting switch sensor 24 transmits a self-driving cancel command to the integrated controller 14 without the OFF-operation of the self-driving switch by the driver. This cancels the self-driving mode and controls to switch to the manual-driving mode.

Figure 4:
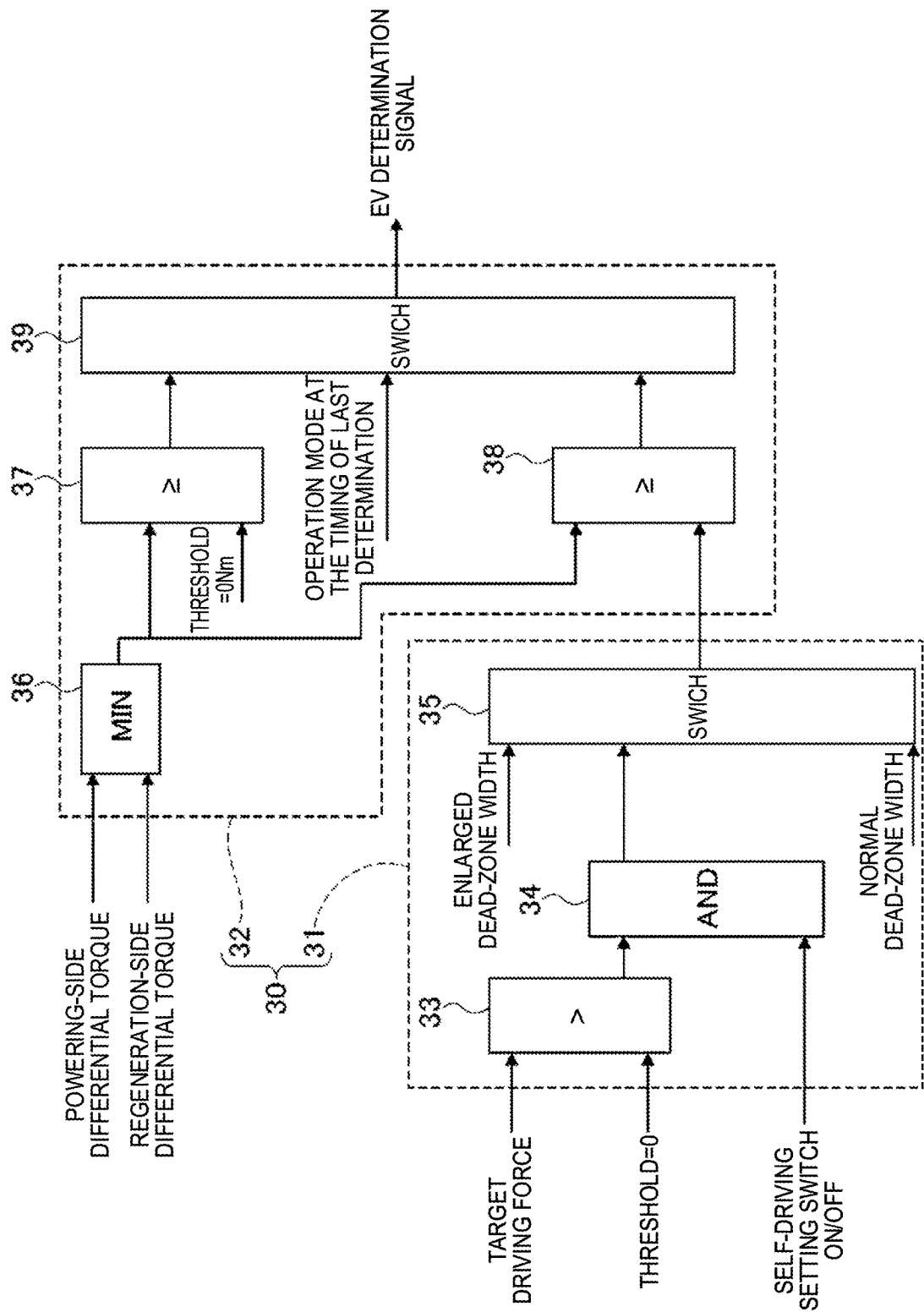
FIG. 4 is a block diagram showing the configuration of an EV enabling determination circuit in Example 1.

In this Example 1, the integrated controller 14 includes a cruise control unit 26 and an EV enabling determination circuit 30 shown in FIG. 4.

Receiving a self-driving command, the cruise control unit 26 receives the target vehicle-speed and the actual vehicle-speed and calculates a target driving force. Based on the calculation result of the target driving force, the cruise control unit 26 outputs a control command to the transmission controller 15, the engine controller 17, the motor controller 18, and the brake controller 20.

The transmission controller 15 performs transmission control based on the information other than the accelerator position, and the engine controller 17 and the motor controller 18 perform engine-torque control, motor-rotation-speed control, and motor-torque control depending on the running mode, such as constant-speed running, running to follow a vehicle ahead, and acceleration running.

The brake controller 20 outputs a braking-force command to the brake-fluid pressure actuator BA to perform brake-fluid-pressure control depending on the running mode, such as deceleration running or running to follow a vehicle ahead.

The EV enabling determination circuit 30 sets the width of the dead-zone H on the mode-shift map, and determines whether or not to enable the setting of the "EV mode" based on the set dead-zone width and the torque that the motor generator MG can output. The EV enabling determination circuit 30 includes a dead-zone width setting unit 31 and an EV enabling determination unit 32.

As shown in FIG. 4, the dead-zone width setting unit 31 has a motor-control determination block 33, an operation-state determination block 34, and a dead-zone width setting block 35.

The motor-control determination block 33 determines whether the motor generator MG is controlled to perform powering or regeneration. This motor-control determination block 33 receives a target driving force at the timing of determination and preset threshold information (=zero). The motor-control determination block 33 then determines whether the target driving force is the threshold information (zero) or more or not. When the target driving force>0, the motor-control determination block 33 determines that the motor generator MG is controlled to perform powering, and outputs a powering determination signal. When the target driving force≤zero, the motor-control determination block 33 determines that the motor generator MG is controlled to perform regeneration, and outputs a regeneration determination signal.

When the self-driving mode is set, the target driving force is calculated based on the target vehicle-speed and the actual vehicle-speed. When the manual-driving mode is set (i.e., self-driving mode is not set), the target driving force is calculated based on the vehicle-speed and the accelerator position.

The operation-state determination block 34 determines whether the motor generator MG is controlled to perform powering or not and whether the self-driving mode is set or not. This operation-state determination block 34 receives a determination signal from the motor-control determination block 33 and command information from the self-driving setting switch sensor 24. The operation-state determination block 34 then determines whether both of the powering determination signal and the self-driving command are input or not. When the powering AND the self-driving holds, the operation-state determination block 34 outputs an enlargement determination signal. When the regeneration OR the manual-driving holds, the operation-state determination block 34 outputs a normal determination signal.

The dead-zone width setting block 35 EV sets the width of the dead-zone H on the mode-shift map. This dead-zone width setting block 35 receives the determination signal from the operation-state determination block 34. When receiving the enlargement determination signal, the dead-zone width setting block 35 selects an "enlarged dead-zone width" for the width of the dead-zone H and outputs an enlarged dead-zone width setting signal. When receiving the normal determination signal, the dead-zone width setting block 35 selects a "normal dead-zone width" for the width of the dead-zone H and outputs a normal dead-zone width setting signal.

The "enlarged dead-zone width" means an enlarged width relative to the dead-zone width Wa (Wb) set for the manual-driving mode. The "normal dead-zone width" means a dead-zone width that is not enlarged relative to the dead-zone width Wa (Wb) set for the manual-driving mode, i.e., it has the same width as the dead-zone width Wa (Wb) set for the manual-driving mode.

As shown in FIG. 4, the EV enabling determination unit 32 has a motor-differential-torque selection block 36, an EV determination block 37, an HEV determination block 38, and an enabling determination block 39.

The motor-differential-torque selection block 36 calculates a difference between the critical torque of the motor generator MG and the target driving force. This motor-differential-torque selection block 36 receives a value (hereinafter called "powering-side differential torque") calculated by subtracting a target driving force at the timing of determination from the powering-side maximum torque (maximum motor torque) of the motor generator MG, and a value (hereinafter called "regeneration-side differential torque") calculated by subtracting a regeneration-side minimum torque (minimum motor torque) from the target driving force at the timing of determination. The motor-differential-torque selection block 36 then selects a smaller torque between the powering-side differential torque and the regeneration-side differential torque and outputs the selected torque as a "motor-differential-torque".

When the self-driving mode is set, the target driving force is calculated based on the target vehicle-speed and the actual vehicle-speed. When the manual-driving mode is set (i.e., self-driving mode is not set), the target driving force is calculated based on the vehicle-speed and the accelerator position.

The EV determination block 37 determines whether the torque (motor torque) of the motor generator MG suffices for the target driving force or not. This EV determination block 37 receives a "motor-differential-torque" output from the motor-differential-torque selection block 36. The EV determination block 37 then determines whether the "motor-differential-torque" is a threshold zero [Nm] or more or not. When the motor-differential-torque≥zero, the EV determination block 37 determines that the motor torque suffices for the target driving force, and outputs an EV enabling signal. When the motor-differential-torque<zero, the EV determination block 37 determines that the motor torque does not suffice for the target driving force, and outputs an EV disabling signal.

The "EV enabling signal" is to instruct the enabling of setting of the "EV mode", and the "EV disabling signal" is to instruct the disabling of setting of the "EV mode".

The HEV determination block 38 determines whether the "motor-differential-torque" is within the dead-zone width or not. This HEV determination block 38 receives the "motor-differential-torque" from the motor-differential-torque selection block 36 and the enlarged dead-zone width setting signal or the normal dead-zone width setting signal from the dead-zone width setting block 35. The HEV determination block 38 then determines whether the "motor-differential-torque" is a dead-zone width or more that is set based on the input signal from the dead-zone width setting block 35. When the motor-differential-torque≥the dead-zone width, the HEV determination block 38 determines that the operating point P set on the mode-shift map (FIG. 2) shifts from the HEV area to the EV area via the dead-zone H, and outputs an EV enabling signal. When the motor-differential-torque<the dead-zone width, the HEV determination block 38 determines that the operating point P set on the mode-shift map (FIG. 2) remains in the dead-zone, and outputs an EV disabling signal.

The enabling determination block 39 determines whether or not to enable the setting of the "EV mode". This enabling determination block 39 receives an operation-mode signal indicating the operation mode of the FF hybrid vehicle at the timing of the last determination, a signal output from the EV determination block 37, and a signal output from the HEV determination block 38. When receiving an operation-mode signal indicating that the "EV mode" is set at the timing of the last determination, the enabling determination block 39 outputs the signal output from the EV determination block 37 as an "EV-determination signal". When receiving an operation-mode signal indicating that the "HEV mode" is set at the timing of the last determination, the enabling determination block 39 outputs the signal output from the HEV determination block 38 as an "EV-determination signal".

The "at the timing of the last determination" means a timing when the last EV determination signal is output before the present moment.

[Configuration of Dead-Zone Width Setting]

Figure 5:
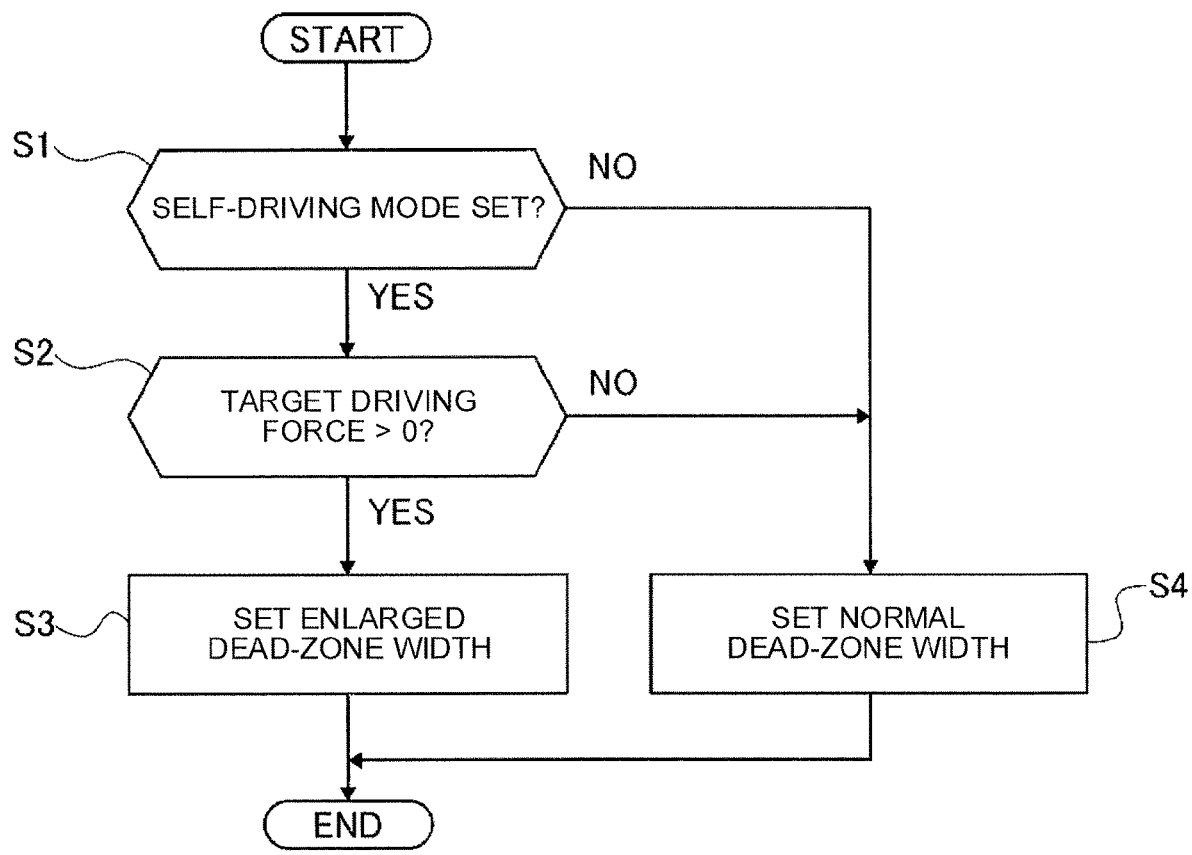
FIG. 5 is a flowchart showing a process of dead-zone width setting executed by a dead-zone width setting unit of Example 1.

FIG. 5 is a flowchart showing the process of the dead-zone width setting executed by the dead-zone width setting unit 31 of Example 1. Referring to FIG. 5, the following describes the configuration of the dead-zone width setting in Example 1. The dead-zone width setting unit 31 repeatedly executes this dead-zone width setting procedure with a preset period during the ON-state of the ignition switch of the FF hybrid vehicle.

At Step S1, the dead-zone width setting unit 31 determines whether the self-driving mode is set or not. In the case of YES (self-driving mode), the procedure shifts to Step S2. In the case of NO (manual-driving mode), the procedure shifts to Step S4.

The dead-zone width setting unit 31 makes such a determination on the self-driving mode based on an operation signal of the self-driving switch detected by the self-driving setting switch sensor 24.

At Step S2, following the determination of the self-driving mode at Step S1, the dead-zone width setting unit 31 determines whether the target driving force exceeds zero or not, i.e., whether or not to control the motor generator MG to perform the powering. In the case of YES (target driving force>zero), the procedure shifts to Step S3. In the case of NO (target driving force≥zero), the procedure shifts to Step S4.

The target driving force is calculated based on the target vehicle-speed and the actual vehicle-speed.

At Step S3, following the determination of the target driving force>zero at Step S2, the dead-zone width setting unit 31 sets the dead-zone width as the "enlarged dead-zone width" so as to control the motor generator MG to perform the powering during the self-driving mode, and the procedure shifts to the end.

At Step S4, following the determination of the manual-driving mode at Step S1 or the determination of the target driving force≤zero at Step S2, the dead-zone width setting unit 31 sets the dead-zone width as the "normal dead-zone width" so as to control the motor generator MG to perform the regeneration or because the self-driving mode is not set, and the procedure shifts to the end.

[Configuration of EV Enabling Determination]

Figure 6:
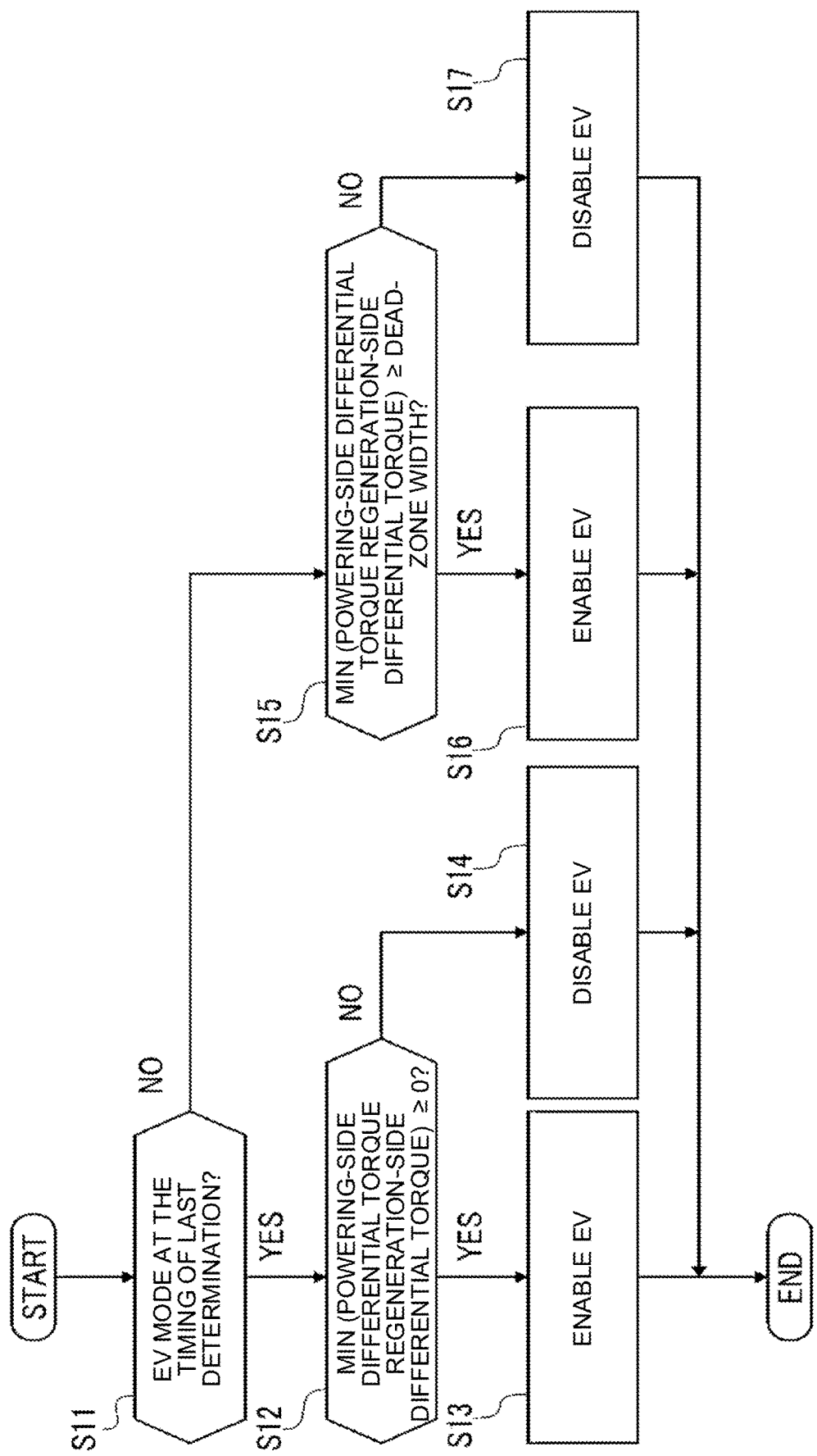
FIG. 6 is a flowchart showing a process of EV enabling determination executed by an EV enabling determination unit of Example 1.

FIG. 6 is a flowchart showing the process of the EV enabling determination executed by the EV enabling determination unit 32 of Example 1. Referring to FIG. 6, the following describes the configuration of the EV enabling determination in Example 1. The EV enabling determination unit 32 repeatedly executes this EV enabling determination procedure with a preset period during the ON-state of the ignition switch of the FF hybrid vehicle.

At Step S11, the EV enabling determination unit 32 determines whether the operation mode of the FF hybrid vehicle at the timing of the last determination is the "EV mode" or not. In the case of YES (EV mode), the procedure shifts to Step S12. In the case of NO (HEV mode), the procedure shifts to Step S15.

The memory (not shown) of the integrated controller 14, for example, may store the operation mode at the timing of the last determination.

At Step S12, following the determination of the EV mode at the timing of the last determination at Step S11, the EV enabling determination unit 32 determines whether a smaller value between the powering-side differential torque and the regeneration-side differential torque (motor-differential-torque) is zero or more or not. In the case of YES (motor-differential-torque≥zero), the procedure shifts to Step S13. In the case of NO (motor-differential-torque<zero), the procedure shifts to Step S14.

At Step S13, following the determination of motor-differential-torque≥zero at Step S12, the EV enabling determination unit 32 determines that the motor torque suffices for the target driving force, and outputs an EV enabling signal. The procedure then shifts to the end. As a result, the FF hybrid vehicle keeps the "EV mode".

The "motor torque sufficing for the target driving force" means that when the motor generator MG is controlled to perform powering, the motor-output-torque achieves the target driving force for driving, and when the motor generator MG is controlled to perform regeneration, the motor-regenerative-torque achieves the target driving force (braking force) for regeneration.

At Step S14, following the determination of motor-differential-torque<zero at Step S12, the EV enabling determination unit 32 determines that the motor torque does not suffice for the target driving force, and the driving torque from the engine Eng and the engine friction are required. Then the EV enabling determination unit 32 outputs an EV disabling signal, and the procedure then shifts to the end. As a result, the FF hybrid vehicle is allowed to shift to the "HEV mode".

At Step S15, following the determination of the HEV mode at the timing of the last determination at Step S11, the EV enabling determination unit 32 determines whether a smaller value between the powering-side differential torque and the regeneration-side differential torque (motor-differential-torque) is the value of the dead-zone width or more or not. The dead-zone width is set at the dead-zone width setting procedure shown in FIG. 5. In the case of YES (motor-differential-torque≥dead-zone width), the procedure shifts to Step S16. In the case of NO (motor-differential-torque<dead-zone width), the procedure shifts to Step S17.

At Step S16, following the determination of motor-differential-torque≥dead-zone width at Step S15, the EV enabling determination unit 32 determines that the operating point P set on the mode-shift map (FIG. 2) shifts to the EV area via the dead-zone H, and outputs an EV enabling signal. The procedure then shifts to the end. As a result, the FF hybrid vehicle is allowed to shift to the "EV mode".

At Step S17, following the determination of motor-differential-torque<dead-zone width at Step S15, the enabling determination unit 32 determines that the operating point P set on the mode-shift map (FIG. 2) remains in the dead-zone H, and outputs an EV disabling signal. The procedure then shifts to the end. As a result, the FF hybrid vehicle keeps the "HEV mode".

Next the following describes the functions. The following firstly describes "problems about EV-HEV hunting in different driving modes", and then describes the functions of the control method for hybrid vehicles in Example 1 about the "function to suppress EV-HEV hunting" and the "function to suppress regeneration reduction".

[Problems about EV-HEV Hunting in Different Driving Modes]

The FF hybrid vehicle of Example 1 sets the operation mode at any one between the "EV mode" to disconnect the engine Eng from the driving system and the "HEV mode" to connect the engine Eng to the driving system based on the target driving force and the mode-shift map.

When a variation of the target driving force causes the operating point P, which is set in accordance with this target driving force, to move from the EV area to the HEV area on the mode-shift map, then the operation mode switches from the "EV mode" to the "HEV mode", i.e., the mode shifts from EV to HEV. When the operating point P moves from the HEV area to the EV area via the dead-zone H on the mode-shift map, then the operation mode switches from the "HEV mode" to the "EV mode", i.e., the mode shifts from HEV to EV.

If the target driving force fluctuates, this causes the operating point P to repeatedly move between the EV area and the HEV area in a short time, so that the operation mode of the FF hybrid vehicle shifts like the "HEV mode"→the "EV mode"→the "HEV mode", for example, in a short time. This phenomenon is "EV-HEV hunting".

More specifically this causes the repetition of engagement/releasing of the first clutch CL1 and stopping/restarting of the engine Eng in a short time.

When the self-driving mode is set, the target driving force is calculated by feedback controlling to let the actual vehicle-speed follow the target vehicle-speed. A response delay in this feedback control may cause fluctuation of the target driving force, and this may cause the "EV-HEV hunting".

The actual vehicle-speed varies with the road environment and the driving environment. During the self-driving mode, the vehicle may adjust the target vehicle-speed with this variation of the actual vehicle-speed too much, and this may result in the fluctuation of the target driving force, and accordingly may cause the "EV-HEV hunting".

During the manual-driving mode, the driver estimates a target driving force because they operate the corresponding pedal, and so the driver will not feel strangeness or will not be bothered too much about the "EV-HEV hunting", if any. On the contrary, during the self-driving mode, the driver does not operate the accelerator pedal and the brake pedal. The driver therefore does not estimate a target driving force, and so the "EV-HEV hunting" if any, may bother the driver. In other words, the driver's sensitivity to the "EV-HEV hunting" increases during the self-driving mode.

In this way, this "EV-HEV hunting" more easily occurs during the self-driving mode than during the manual-driving mode. Further, a certain driving scene, which would not bother the driver during the manual-driving mode, may bother the driver during the self-driving mode.

To suppress the "EV-HEV hunting" during the self-driving mode, the width of the dead-zone H (dead-zone width) in the EV area set for the self-driving mode may be enlarged relative to the dead-zone width set for the manual-driving mode.

Such an enlarged dead-zone width, however, always suppresses the shifting from the "HEV mode" to the "EV mode", and so reduces the regenerative amount.

[Function to Suppress EV-HEV Hunting]

The EV enabling determination circuit 30 of the FF hybrid vehicle in Example 1 determines whether or not to enable the setting of the "EV mode" based on the torque that the motor generator MG can output.

Specifically the EV enabling determination circuit 30 firstly sets the width of the dead-zone H on the mode-shift map. At this time, as shown in FIG. 5, the EV enabling determination circuit 30 determines whether the self-driving mode is set or not (Step S1). When the self-driving mode is set, the EV enabling determination circuit 30 determines whether the target driving force exceeds zero or not, i.e., whether or not to control the motor generator MG to perform the powering (Step S2). To control the motor generator MG to perform the powering, the EV enabling determination circuit 30 sets the dead-zone width as the "enlarged dead-zone width" (Step S3). When the self-driving mode is not set (manual-driving mode is set) or to control the motor generator MG to perform the regeneration, the EV enabling determination circuit 30 sets the dead-zone width as the "normal dead-zone width" (Step S4).

As a result, as shown in FIG. 2, the dead-zone width Wa set in the powering-control area and the dead-zone width Wb set in the regeneration-control area are the same during the manual-driving mode. The dead-zone width Wα set in the powering-control area during the self-driving mode has an enlarged width relative to the dead-zone width Wa set in the powering-control area during the manual-driving mode. Meanwhile, the dead-zone width Wβ set in the regeneration-control area is not enlarged relative to the dead-zone width Wb set in the regeneration-control area during the manual-driving mode, and has the same width.

That is, the amount to enlarge the width of the dead-zone H during the self-driving mode relative to the dead-zone width during the manual-driving mode is larger in the case of controlling of the motor generator MG to perform the powering than in the case of controlling of the motor generator MG to perform the regeneration.

This considerably increases the dead-zone width Wa to control the motor generator MG to perform the powering during self-driving mode as compared with the dead-zone width Wa during the manual-driving mode. This allows the operating point P to remain in the dead-zone H even when the target driving force fluctuates to control the motor generator MG to perform the powering. This suppresses the "EV-HEV hunting", and suppresses an increase in the frequency of mode switching. This also reduces the bother felt by the driver.

Especially Example 1 is configured so that the dead-zone width Wα set in the powering-control area during the self-driving mode is a width that absorbs the fluctuation of the target driving force that is generated during the self-driving mode. Such an adequate width of the dead-zone width Wα adequately suppresses the "EV-HEV hunting" during the self-driving mode.

[Function to Suppress Regeneration Reduction]

As stated above, the EV enabling determination circuit 30 of the FF hybrid vehicle in Example 1 sets the dead-zone width Wβ to control the motor generator MG to perform the regeneration at the "normal dead-zone width" for the self-driving mode as well.

This means that the enlarged amount of the dead-zone width Wβ to control the motor generator MG to perform the regeneration during the self-driving mode relative to the dead-zone width during the manual-driving mode is smaller than that in the case of controlling of the motor generator MG to perform the powering. This suppresses the narrowing of the EV area to control the motor generator MG to perform the regeneration.

That is, during the self-driving mode, the mode shift from HEV to EV is less limited in the case of controlling the motor generator MG to perform the regeneration than in the case of controlling the motor generator MG to perform the powering, and this suppresses reduction in the regenerative amount.

Note here that the target driving force of the FF hybrid vehicle in Example 1 may fluctuate irrespective of the driving mode and when the motor generator MG is controlled to perform the regeneration as well, and in the case, the "EV-HEV hunting" may occur.

The absolute value of the required output driving force (regenerative force) is smaller in the case of controlling the motor generator MG to perform the regeneration than in the case of controlling the motor generator MG to perform the powering. The enlarged amount of the dead-zone width Wβ to control the motor generator MG to perform the regeneration may be set smaller than that to control the motor generator MG to perform the powering. This suppresses "EV-HEV hunting" and so reduces the frequency of mode switching, and accordingly reduces the bother felt by the driver.

Specifically in the case of controlling the motor generator MG to perform the regeneration, the servo performance during calculation of the target driving force by feedback control is lowered. This is to prevent the repetition of hunting of fuel cut to stop the fuel injection to the engine Eng and the fuel-cut recovering to cancel the fuel cut. The absolute value of the required output driving force (regenerative force) therefore is smaller in the case of controlling the motor generator MG to perform the regeneration than in the case of controlling the motor generator MG to perform the powering, and the fluctuation width of the target driving force is accordingly narrower. This suppresses the "EV-HEV hunting" during the self-driving mode without increasing the width of the dead-zone H.

Figure 7A:
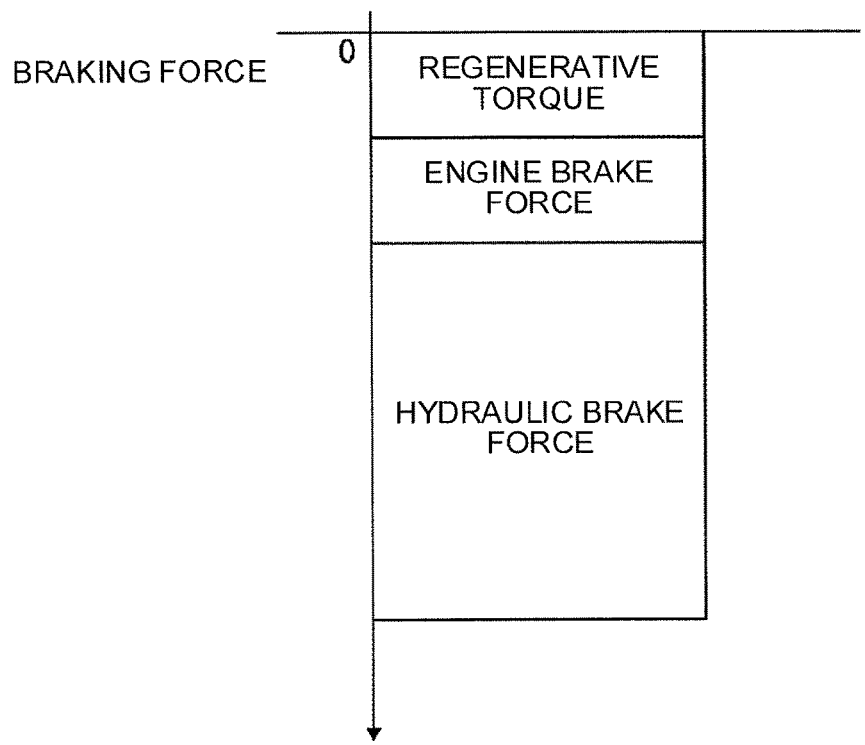
FIG. 7A schematically shows a distribution rate of a braking force for normal setting during a self-driving mode.

As shown in FIG. 7A, in response to a deceleration request, the self-driving mode firstly generates a braking force with the regenerative torque of the motor generator MG in a case of normal setting. The braking force obtained from this regenerative torque corresponds to the engine brake force (engine friction). If the braking force obtained from the regenerative torque is insufficient for the deceleration request, the operation mode shifts to the HEV mode so as to generate a braking force with the engine brake force (engine friction). If the braking force is still insufficient, then the braking force is obtained from a hydraulic brake force.

Figure 7B:
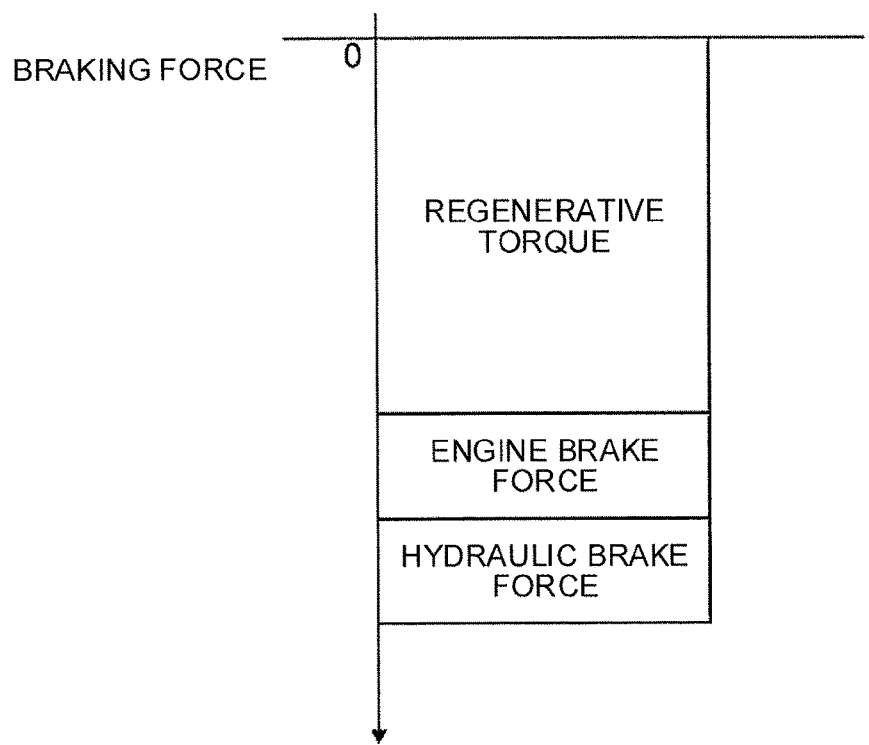
FIG. 7B schematically shows a distribution rate of a braking force for setting to limit the use of a hydraulic brake force during the self-driving mode.

In a case where a strong regeneration mode that sets a regenerative amount with the motor generator MG more than the amount corresponding to the engine brake force (engine friction) to increase the braking force obtained from the regenerative torque is set during the self-driving mode as shown in FIG. 7B, if the braking force obtained from the regenerative torque is insufficient for the deceleration request, this case also generates the braking force from the engine brake force (engine friction) and the hydraulic brake force. The amount of the hydraulic brake force, however, is limited because the braking force from the regenerative torque increases. In such a case, the vehicle typically has a function to keep the operation mode at the "HEV mode" when there is the upper limit of the regenerative torque, and the engine brake force (engine friction) is required. When this function is activated, the operation mode of the vehicle is kept at the "HEV mode", and so "EV-HEV hunting" does not occur.

In this way, when the vehicle has the function of keeping the operation mode at the "HEV mode", "EV-HEV hunting" occurs less frequently in the case of controlling the motor generator MG to perform the regeneration than in the case of controlling the motor generator MG to perform the powering. That is, this suppresses the enlargement of the dead-zone width Wβ during the self-driving mode as well, and so suppresses reduction in the regenerative amount.

Example 1 is configured so that the dead-zone width Wβ set in the regeneration-control area during the self-driving mode is not enlarged relative to the dead-zone width Wb set in the regeneration-control area during the manual-driving mode, and has the same width. That is, as shown in FIG. 2, the width of the EV area to control the motor generator MG to perform the regeneration does not change between the manual-driving mode and the self-driving mode.

The mode shift from HEV to EV during the self-driving mode therefore will be similar to that during the manual-driving mode. This prevents a reduction in regenerative amount during the self-driving mode from that during the manual-driving mode.

Next the following describes the advantageous effects.

The control method for hybrid vehicles in Example 1 has the following advantageous effects.

(1) A control method for a hybrid vehicle that changes an operation mode of the hybrid vehicle between a hybrid electric vehicle mode (HEV mode) that connects both of a motor (motor generator MG) and an engine Eng to driving wheels (left driving wheel LT and right driving wheel RT) so as to transmit a driving force from the motor and the engine, and an electric vehicle mode (EV mode) that disconnects the engine Eng from a driving system and connects the motor (motor generator MG) only to the driving wheels (left driving wheel LT and right driving wheel RT) so as to transmit a driving force from the motor, and the method includes:

calculating a target driving force to control the motor (motor generator MG) to perform powering or a target driving force to control the motor (motor generator MG) to perform regeneration;

determining whether the target driving force is in an electric vehicle area (EV area) having a small absolute value of the target driving force or in a hybrid electric vehicle area (HEV area) having an absolute value of the target driving force larger than the absolute value of the electric vehicle area;

when the target driving force shifts from the electric vehicle area (EV area) to the hybrid electric vehicle area (HEV area), changing the operation mode from the electric vehicle mode (EV mode) to the hybrid electric vehicle mode (HEV mode);

when the target driving force shifts from the hybrid electric vehicle area (HEV area) to the electric vehicle area (EV area) via a dead-zone II, changing the operation mode from the hybrid electric vehicle mode (HEV mode) to the electric vehicle mode (EV mode);

when self-driving is not set (i.e., manual-driving mode is set), calculating the target driving force based on the vehicle-speed VSP and the driver's driving operation APO; and when self-driving is set, calculating the target driving force based on a target vehicle-speed and an actual vehicle-speed, and setting an amount to enlarge a dead-zone width Wα to control the motor (motor generator MG) to perform powering relative to the dead-zone width Wa when the self-driving is not set (manual-driving mode is set) larger than an amount to enlarge a dead-zone width Wβ to control the motor (motor generator MG) to perform regeneration relative to the dead-zone width Wb when the self-driving is not set (manual-driving mode is set).

This suppresses an increase in the frequency of mode switching while suppressing a decrease in the regenerative amount when the hybrid vehicle is set at the self-driving mode.

(2) The method enlarges the dead-zone width Wα to control the motor (motor generator MG) to perform powering when the self-driving is set relative to the dead-zone width Wa to control the motor (motor generator MG) to perform powering when the self-driving is not set (manual-driving mode is set), and does not enlarge the dead-zone width Wβ to control the motor (motor generator MG) to perform regeneration when the self-driving is set relative to the dead-zone width Wb to control the motor (motor generator MG) to perform regeneration when the self-driving is not set (manual-driving mode is set).

This allows the operation mode during the regenerative control to shift from HEV to EV during the self-driving mode as well similar to the manual-driving mode, and so prevents a reduction of the regenerative amount from during the manual-driving mode.

(3) The method calculates the target driving force by feedback control when the self-driving is set, and sets the dead-zone width Wα to control the motor (motor generator MG) to perform powering to a width that absorbs fluctuation of the target driving force due to the feedback control.

This sets an adequate dead-zone width Wα, and adequately suppresses the "EV-HEV hunting" during the self-driving mode.

The above describes a control method for hybrid vehicles of the present disclosure by way of Example 1, and the specific configuration of the present disclosure is not limited to Example 1. The design may be changed or may have additions without departing from the scope of the invention according to the following claims.

Example 1 describes the example where the dead-zone width Wβ to control the motor generator MG to perform regeneration during self-driving mode is not enlarged relative to the dead-zone width Wb during manual-driving mode. This is not a limiting example. The enlarged amount of the dead-zone width Wβ may be smaller than the dead-zone width Wα to control the motor generator MG to perform powering, and the dead-zone width Wβ may be enlarged relative to the dead-zone width Wb.

A control method for hybrid vehicles in Example 1 is applied to an FF hybrid vehicle including a parallel hybrid driving system called a 1-motor/2-clutche type. This is not a limiting example, and the control method for hybrid vehicles of the present disclosure may be applied to any hybrid vehicle irrespective of the form of the driving system as long as the vehicle enables switching between the EV mode and the HEV mode.

The invention claimed is:

1. A control method for a hybrid vehicle that changes an operation mode of the hybrid vehicle between a hybrid electric vehicle mode that connects both of a motor and an engine to driving wheels so as to transmit a driving force from the motor and the engine, and an electric vehicle mode that disconnects the engine from a driving system and connects the motor only to the driving wheels so as to transmit a driving force from the motor, the method comprising:

calculating a target driving force to control the motor to perform powering or a target driving force to control the motor to perform regeneration;

determining whether the target driving force is in an electric vehicle area having a small absolute value of the target driving force or in a hybrid electric vehicle area having an absolute value of the target driving force larger than the absolute value of the electric vehicle area;

when the target driving force shifts from the electric vehicle area to the hybrid electric vehicle area, changing the operation mode from the electric vehicle mode to the hybrid electric vehicle mode;

when the target driving force shifts from the hybrid electric vehicle area to the electric vehicle area via a dead-zone, changing the operation mode from the hybrid electric vehicle mode to the electric vehicle mode;

when self-driving is not set, calculating the target driving force based on a vehicle-speed and a driver's driving operation; and when self-driving is set, calculating the target driving force based on a target vehicle-speed and an actual vehicle-speed, and setting an amount to enlarge a dead-zone width to control the motor to perform powering relative to a dead-zone width when the self-driving is not set larger than an amount to enlarge a dead-zone width to control the motor to perform regeneration relative to a dead-zone width when the self-driving is not set.

2. The control method for the hybrid vehicle according to claim 1, wherein the method enlarges the dead-zone width to control the motor to perform powering when the self-driving is set relative to the dead-zone width to control the motor to perform powering when the self-driving is not set, and does not enlarge the dead-zone width to control the motor to perform regeneration when the self-driving is set relative to the dead-zone width to control the motor to perform regeneration when the self-driving is not set.

3. The control method for the hybrid vehicle according to claim 1, wherein the method calculates the target driving force by feedback control when the self-driving is set, and sets the dead-zone width to control the motor to perform powering to a width that absorbs fluctuation of the target driving force due to the feedback control.

* * * * *